(12) United States Patent
Karlsson et al.

(10) Patent No.: US 8,716,608 B2
(45) Date of Patent: May 6, 2014

(54) METHOD FOR WEIGHING PRODUCTS AND A CHECKWEIGHER WITH ROLLER ASSEMBLIES THAT DAMPEN THE MOVEMENT OF THE PRODUCE PRIOR TO WEIGHING

(75) Inventors: Anders Karlsson, Kalmar (SE); Jan Nilsson, Kalmar (SE)

(73) Assignee: Norden Machinery AB (SE)

( * ) Notice: Subject to any disclaimer, the term of this patent is extended or adjusted under 35 U.S.C. 154(b) by 192 days.

(21) Appl. No.: 13/202,923

(22) PCT Filed: Mar. 10, 2010

(86) PCT No.: PCT/SE2010/050270
§ 371 (c)(1),
(2), (4) Date: Nov. 7, 2011

(87) PCT Pub. No.: WO2010/104465
PCT Pub. Date: Sep. 16, 2010

(65) Prior Publication Data
US 2012/0103702 A1   May 3, 2012

(30) Foreign Application Priority Data
Mar. 10, 2009  (SE) ...................................... 0900309

(51) Int. Cl.
*G01G 11/00* (2006.01)
*B65G 47/00* (2006.01)

(52) U.S. Cl.
USPC ................................... 177/1; 177/52; 414/21

(58) Field of Classification Search
USPC ............ 177/1, 52–57, 119, 145, 146; 414/21; 198/959
See application file for complete search history.

(56) References Cited

U.S. PATENT DOCUMENTS 4,901,808 A * 2/1990 Wu ................................. 177/145
5,244,100 A * 9/1993 Regier et al. ................... 209/556

(Continued)

FOREIGN PATENT DOCUMENTS

| EP | 0540126 A1 | 5/1993 |
| SE | 0800934 | 10/2009 |
| WO | WO-98/33046 A1 | 7/1998 |
| WO | WO-00/69724 A1 | 11/2000 |

(Continued)

OTHER PUBLICATIONS

"International Application Serial No. PCT/SE2010/050270, Written Opinion mailed Jun. 8, 2010", 5 pgs.

(Continued)

*Primary Examiner* — Randy W Gibson
*Assistant Examiner* — Natalie Huls
(74) *Attorney, Agent, or Firm* — Schwegman Lundberg & Woessner, P.A.

(57) ABSTRACT

Embodiments of the invention relate to a method and a checkweigher for weighing individual products moved along a production line. In various embodiments, the method compromises transferring at least one product from the production line to a checkweigher comprising at least one weighing cell; placing at least one product in a first position on a first support above a corresponding weighing cell; displacing the at least one product by means of said first support and placing said at least one product in a second position on a second support on the weighing cell; weighing the at least one product; displacing the at least one product back to the first position by means of said first support; and transferring the at least one product from the checkweigher back to the production line.

22 Claims, 7 Drawing Sheets

(56) References Cited

U.S. PATENT DOCUMENTS

| | | | | |
|---|---|---|---|---|
| 5,268,849 | A | * | 12/1993 | Howlett et al. ............... 700/226 |
| 5,306,877 | A | * | 4/1994 | Tas ................................ 177/145 |
| 6,252,181 | B1 | * | 6/2001 | Fallas et al. ................... 177/119 |
| 2011/0150619 | A1 | | 6/2011 | Nilsson |

FOREIGN PATENT DOCUMENTS

WO    WO-2006/085076 A1    8/2006

OTHER PUBLICATIONS

"Swedish Application Serial No. 0900309-6, Office Action dated Aug. 20, 2009", (English Translation), 16 pgs.

"International Application Serial No. PCT/SE2010/050270, International Search Report mailed Jun. 8, 2010", 4 pgs.

"Chinese Application Serial No. 201080011178.6, Office Action mailed Feb. 6, 2013", English translation only, 6 pages.

\* cited by examiner

METHOD FOR WEIGHING PRODUCTS AND A CHECKWEIGHER WITH ROLLER ASSEMBLIES THAT DAMPEN THE MOVEMENT OF THE PRODUCE PRIOR TO WEIGHING

RELATED APPLICATIONS

This application is a nationalization under 35 U.S.C. 371 of PCT/SE2010/050270, filed Mar. 10, 2010 and published as WO 2010/104465 A1 on Sep. 16, 2010, which claims priority to Sweden Patent Application No. 0900309-6, filed Mar. 10, 2009; which applications and publication are incorporated herein by reference in their entirety.

TECHNICAL FIELD

The invention relates to the technical field of weighing individual products being moved along a continuous production line, which products are moved along the production line by at least one transfer mechanism.

BACKGROUND ART

In a continuous production line wherein a substance in liquid, semi-liquid or pasty form may be filled into containers it is desirable to monitor the quantity of the substance filled into each container. Prior art checkweighers have often been placed in or under a conveyor transferring the filled product from a filling station to a station for subsequent processing, such as packaging.

Weighing the products while on an intermittently or continuously moving conveyor may appear to be efficient and cost effective. However, such an arrangement may often result in inaccurate readings, especially if the product is moving or if it is not stopped in the exact position required for weighing. Also, if an interruption occurs in the production the synchronization of the position of a stopped product relative to a checkweigher may not coincide with the desired position for weighing. An additional problem is that adjacent products may not be correctly spaced, resulting in inaccurate weight readings for consecutive products.

An object of the invention is to overcome the above problems by providing an improved method and an apparatus for weighing individual products which allow products to be placed in the correct position on a checkweigher every time, and which allow products to be weighed with an improved accuracy.

DISCLOSURE OF INVENTION

The above problems are solved by a method for weighing individual products and a checkweigher according to the appended claims.

The invention relates to a method for weighing individual products being moved along a continuous production line, which products are moved along the production line by at least one transfer mechanism, such as a manipulator or a pick-and-place device.

A checkweigher may preferably, but not necessarily, be located between a filling station and a packaging station in production lines for filling and packaging various types of products. The above method and the checkweigher used in said method can be adapted for weighing a multitude of different products, where there is a need to verify that a predetermined quantity of a particular substance has been filled into a container. For example, the checkweigher may be provided with weighing cells which are electronically controlled and/or monitored and it may be connected to a control unit or computer provided with suitable software for continuous monitoring of the products placed on the weighing cell. The control unit may be provided with predetermined data relating to the weight of the container used for the current substance to be filled and the weight of the associated fixture supporting the product. The control unit may then compensate for the known data in order to determine the weight of the substance that has been filled into the container. The result may be displayed and/or stored in any suitable way desired by the user, for instance by indicating the weight of the filled substance or the weight of the filled product. The control unit and any software used in such a control unit is not part of the current invention and will not be described in further detail.

In the subsequent text, the container and the substance therein will be referred to as a product. If the checkweigher detects that a filled product does not have a desired predetermined weight, or is inside a predetermined weight interval or tolerance, then this product is discarded. If it is detected that multiple products fall outside the desired weight interval, then the production line may be stopped to correct a possible malfunction.

The type of containers to be filled is dependent on the product. A non-limiting list of examples may include various types of hard or flexible tubes, glass or plastic bottles, plastic and/or cardboard cartons, glass vials, blister packs, or containers intended for a specific purpose or a specific product, such as lipstick. Typical examples of suitable substances to be filled into such containers are consumer products, such as liquid, semi-liquid or pasty foodstuffs, toothpaste, cosmetic products, such as lipstick, perfume, skin or hair care products, medicinal products, in liquid or pasty form, or in the form of tablets, pills or vials.

The method according to the invention involves the steps of
  transferring at least one product from the production line to a checkweigher comprising at least one weighing cell;
  placing at least one product in a first position on a first support above a corresponding weighing cell;
  displacing the at least one product by means of said first support and placing said at least one product in a second position on a second support on the weighing cell;
  weighing the at least one product;
  displacing the at least one product back to the first position by means of said first support; and
  transferring the at least one product from the checkweigher back to the production line.

The transfer to and from the checkweigher may be achieved using any suitable transfer mechanism, such as a manipulator or a pick-and-place device. The at least one transfer mechanism may be provided with gripping means, suction means or similar. The transfer may be performed by a single transfer mechanism, moving products to and from the checkweigher from a single conveyor or between conveyors placed upstream and downstream relative to the checkweigher. Alternatively, a first transfer mechanism may move products from a first conveyor to the checkweigher, and a second transfer mechanism may move products from the checkweigher to a second conveyor. The type and number of transfer mechanism(-s) used is dependent on the production speed, i.e. the number of products per minute, and/or the layout of the production line. Non-limiting examples of manipulators that may be used for the said purpose are described in the Swedish Patent application SE 0800934-2 and the published international application WO 20000/69724.

After placing the at least one product on the first support, displacement of the at least one product onto the second support may be performed by lowering said first support from its first position until it is out of contact with the said at least one product. Similarly, displacement of the at least one product out of contact with the second support may be performed by raising said first support from its lowered second position into its upper first position.

The method may involve transferring one or more products at the time between the production line and the checkweigher. Each product is placed on a separate first support located above and out of contact with each corresponding weighing cell. Hence, if two products are transferred to the checkweigher, then each product is placed on a separate first support arranged above a separate weighing cell. The products are displaced by means of a driving mechanism connected to said first supports. The said first supports are displaced simultaneously and the products are lowered from the first position to the second position, where each product is placed onto a separate second support mounted on the corresponding weighing cell. Once the at least one product is placed in the second position, the weighing cell initiates weighing of the at least one product.

In order to achieve a desired accuracy it is desirable to minimize the total weight to be supported and weighed by the weighing cell. The solution according to the invention allows the weight of the at least one first support to be eliminated. Because the weighing cell is only required to support each product and its second support, the total weight is reduced and the accuracy is improved. For instance, one production line may be designed for handling products weighing as little as 5 g, with an accuracy of approximately ±0.1 g, which is not uncommon in medical products comprising expensive compositions and/or requiring very accurate doses for use. Another production line may be required to handle products weighing several 100 g with an accuracy of ±1 g, preferably ±0.2-0.5 g, such as consumer or cosmetic products. Especially in the first case, relating to medical products, it is important to keep the weight of the second support to a minimum and to calibrate the weighing cell accurately.

The solution also prevents the weighing cell from being subjected to an initial spike load caused by the transfer mechanism depositing the products on the checkweigher. Although the displacement of the product from the first to the second position will cause an initial load transient in the output signal from the weighing cell, this load transient is considerably smaller than said spike load. The time required for completing a weighing cycle can therefore be reduced. The weighing cycle may be reduced further by processing the output signal from the weighing cell using commercially available software. The use of suitable software may reduce the effect of load transients further. This may allow for a relatively high production speed or an increase in production speed with maintained accuracy. In this context, a relatively high production speed is considered to be in the region of 100 products per minute or higher. For example, a checkweigher handling two products at the time and being operated at a production speed of 200 products per minute, may have a weighing cycle of approximately 250 ms or less and the actual weighing process may take in the region of 50-60 ms. In this context, a weighing cycle is the period of time taken from the placing of a product on the checkweigher by a transfer mechanism until its removal there from by the same or a further transfer mechanism. The accuracy of the weighing cell is dependent on the type and capacity of weighing cell, which is in turn selected dependent on the weight range of the product or products to be handled by the production line.

The driving mechanism may be any suitable mechanically, electrically, hydraulically or pneumatically operated device. The driving mechanism may be synchronized with the transfer mechanism, so that the driving mechanism is actuated to lower the first supports as soon as the product transfer to the checkweigher is completed. Similarly, the product transfer from the checkweigher takes place as soon as the weighing is completed and the driving mechanism has raised the first supports to the upper, first position.

In order to minimize interference caused by vibration from the production line or the driving mechanism for the first supports from disturbing the weighing of the products, the checkweigher may be mounted on a separate machine stand. Also, the displacement of the first support may be achieved using a drive means mounted separate from the checkweigher. This may be done by mounting the driving mechanism for the first supports on the machine stand of an adjacent transfer mechanism. When displacing the first support relative to the second support it is also desirable to maintain the first and second supports out of contact with each other at all times.

The invention relates to a checkweigher for weighing individual products being moved along a production line, which products are moved along the production line by at least one transfer mechanism, such as a manipulator or a pick-and-place device. A checkweigher of this type is suitable for use in the method as described above. The checkweigher according to the invention comprises at least one first support arranged to support a product to be weighed; at least one second support mounted on a weighing cell, and a drive means connected to the at least one first support and arranged to displace the at least one first support relative to the second support. The drive means is arranged to displace each first support from the first position, located above the second support, into the second position, located beneath the second support, so that the at least one product is supported by the second support, whereby the at least one product is weighed by the weighing cell.

After completion of the weighing of the at least one product the product is returned to the original, first position. Consequently, the drive means may be arranged to displace each first support from the second position into the first position, so that the at least one product is supported by the first support. The at least one product can then be removed by a transfer mechanism and be replaced by a subsequent product.

The first support is mounted out of contact with the second support in both the first and second positions as well as during the displacement of the first support. This can be achieved by arranging each first support is arranged side-by-side with a corresponding second support. Alternatively, at least a portion of each second support can be arranged to extend through the first support. In this way a product supporting upper surface of the second support may extend above the product supporting upper surface of the first support. Because the weighing cell is only required to support each product and its second support, the weight of the at least one first support to be eliminated. In this way the total weight measured by the weighing cell can be minimized and the accuracy is improved.

In order to minimize interference caused by vibration from the production line or the driving mechanism for the first supports from disturbing the weighing of the products, the checkweigher may be mounted on a separate machine stand. Also, the drive means for the displacement of the first support can be mounted separate from the checkweigher. The first support may for instance be mounted on a displaceable frame connected to the driving mechanism for displacing the first supports. The displaceable frame and the driving mechanism may be mounted on the machine stand of an adjacent transfer mechanism. When displacing the first support relative to the second support it is also desirable to maintain the first and second supports out of contact with each other at all times.

Each of the first and second supports are provided with upper contact surfaces corresponding to a contacting surface on the products to be weighed. The main purpose of the upper contact surfaces is to allow the products to be placed on the checkweigher in a predetermined position and to prevent movement of the products during any subsequent displacement. The upper contact surfaces will maintain each product in this position during the weighing procedure and during the subsequent removal of the products. For this reason the upper contact surfaces of the first and second supports will as a rule have the same or at least similar shapes. However, the shapes of the respective upper surfaces is determined by the shape of the product and/or the relative positioning of the first and second supports. In order to allow the checkweigher to handle products being within the weight range of the weighing cells, but having a different size or shape, the first and second supports may be replaceable. In this way it is possible to exchange a set of first and second supports having a first shape with a set of first and second supports having a second shape.

A first support, as described above, may be attached to a support plate extending over the upper surface of the at least one weighing cell in the horizontal plane. If more than one weighing cell is used, then the support plate may extend over the upper surface of all weighing cell. In addition, the support plate may extend a predetermined distance in the vertical plane below said upper surface around at least part of the periphery of the support plate. In addition to provide a means for attaching replaceable first supports, the support plate also serves to protect at least the upper portion of the weighing cells. The horizontal, upper portion prevents products, leaking substances or any parts of the transfer mechanism from direct or accidental contact with the weighing cells. In addition, the horizontal, upper portion and the vertical, circumferential portion minimizes the effect of turbulence created by rapidly moving transfer mechanisms from interfering with the weighing process.

Alternatively, a first support may be attached to a support frame extending in a horizontal plane at least partially across the upper surface of the at least one weighing cell. Such a support frame may comprise a structural component with transverse and/or longitudinal ribs with attachment points for the at least one first support.

The at least one first support may be attached to such a support plate or frame by means of at least one first fixture. Similarly, the at least one second support may be attached to a weighing cell by means of a second fixture. In this way, each first support attached to the support plate is arranged to be replaceable by the detachment of an associated first fixture. In this example each support is attached by means of an individual, single fixture associated with each individual first support. Alternatively, adjacent first supports attached to the support plate may be arranged to be replaced by the detachment of an associated, common first fixture. In this example, adjacent first supports may be replaced at the same time by removing a single, common fixture. According to a further alternative, the first supports attached to fixtures on the support plate may be arranged to be replaced by removing at least a section of the support plate or the entire support plate. In this example, multiple first supports and fixtures may be replaced by removing a section of the upper surface of the support plate, or by removing all first supports by replacing the entire support plate or frame. A section of the upper surface can comprise a cut-out, such as a square or rectangular portion, in the upper surface onto which section one or more fixtures are attached. The at least one removable section is attached to the support plate by suitable connector means.

The at least one second support may be attached to each weighing cell are arranged to be replaced by the detachment of an associated second fixture. The second support and its fixture may be releasably mounted on an attachment plate fixed to the upper surface of a weighing cell. According to one example, each fixture with its second support may be releasably mounted on an associated attachment plate by a suitable mechanical and/or spring loaded quick release mechanism. According to a further example, multiple fixtures each provided with at least one second support may be mounted for simultaneous release from an attachment plate by means of a common mechanical and/or spring loaded quick release mechanism.

BRIEF DESCRIPTION OF DRAWINGS

The invention will be described in detail with reference to the attached figures. It is to be understood that the drawings are designed solely for the purpose of illustration and are not intended as a definition of the limits of the invention, for which reference should be made to the appended claims. It should be further understood that the drawings are not necessarily drawn to scale and that, unless otherwise indicated, they are merely intended to schematically illustrate the structures and procedures described herein.

EMBODIMENTS OF THE INVENTION

Figure 1:
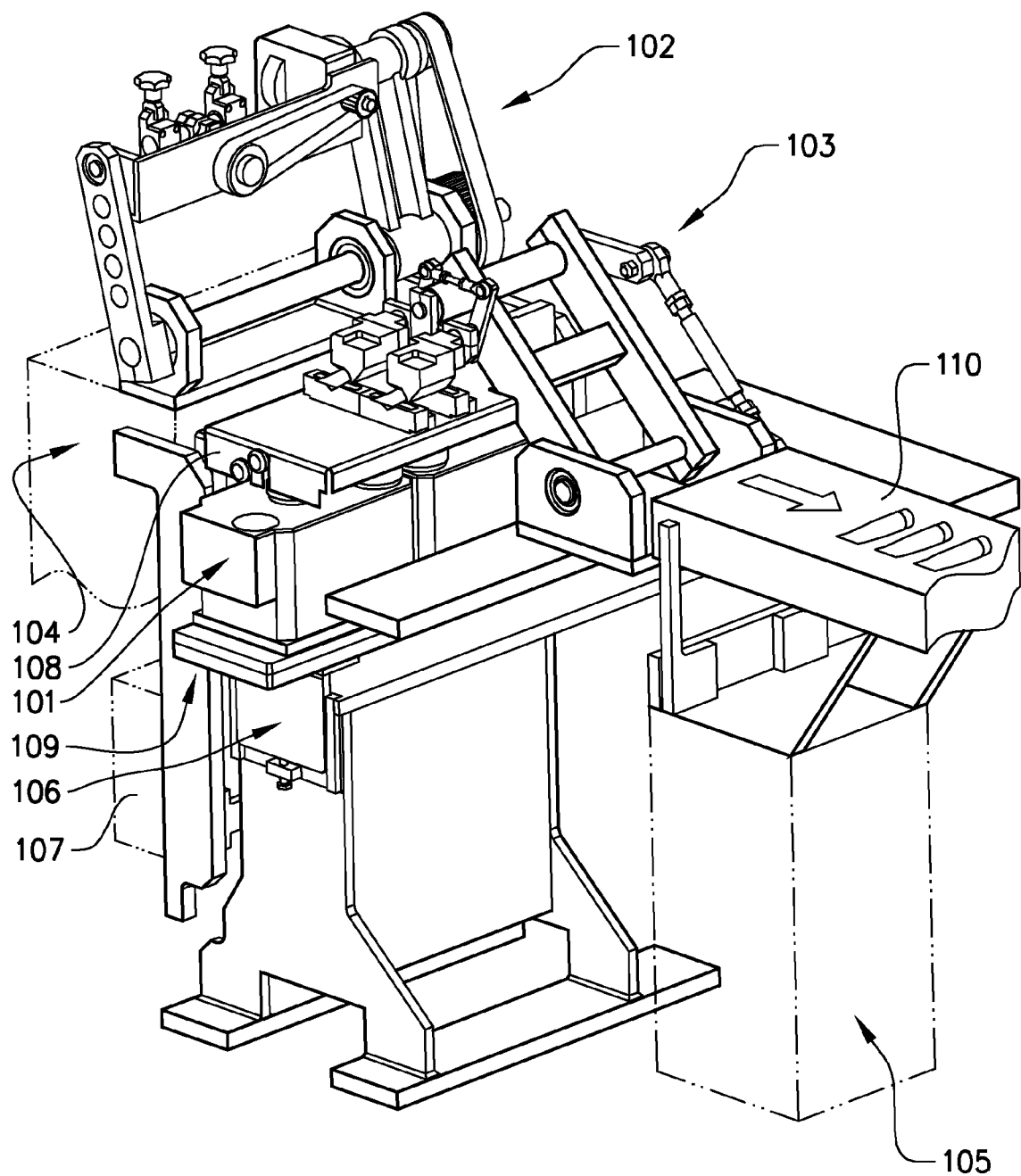
FIG. 1 schematically illustrates a part of a production line with a checkweigher according to the invention.

FIG. 1 schematically illustrates a part of a production line with a checkweigher according to the invention. In this example the checkweigher 101 is located between a filling station and a packaging station (not shown) in a production line for filling and packaging tubes, such as tubes for toothpaste or cosmetic products. The checkweigher in FIG. 1 is located between a first pick-and-place device 102 and a second pick-and-place device 103. The first pick-and-place device 102 is arranged to pick filled tubes arranged in a vertical position from a filling conveyor (not shown), rotate the tubes through an angle of 90° and place the tubes in a horizontal position on the checkweigher 101. The second pick-and-place device 103 is arranged to pick tubes from the horizontal position on the checkweigher 101 and place the tubes in a horizontal position on a subsequent conveyor 110 for transfer to a packaging station. Both the first and the second pick-and-place device 102, 103 are mounted on individual machine stands 104, 105, separate from a machine stand 106 supporting the checkweigher. FIG. 1 shows a checkweigher 101 arranged for weighing two tubes at the time.

Figure 2:
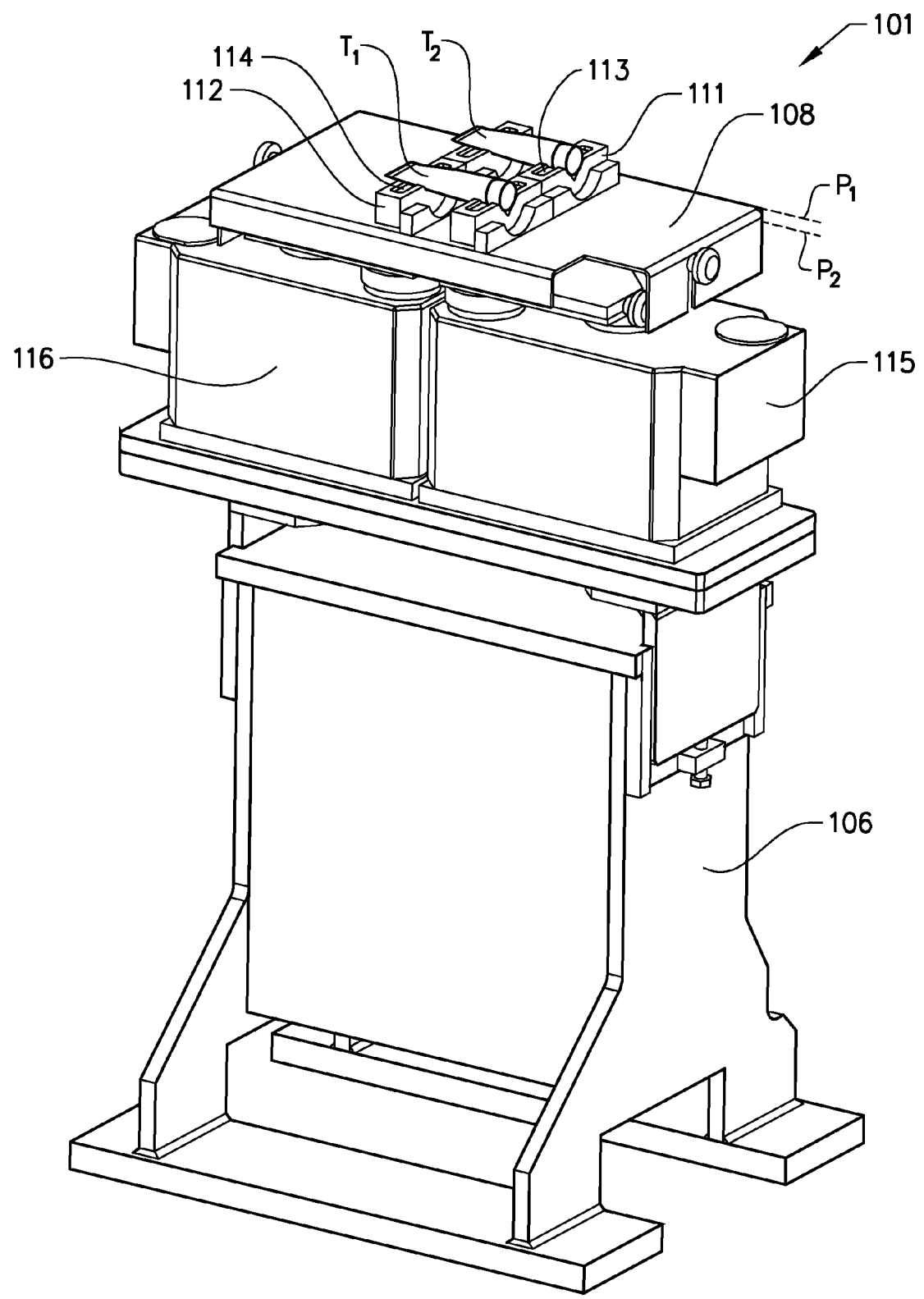
FIG. 2 shows the checkweigher of FIG. 1 with its machine stand.

FIG. 2 shows the checkweigher 101 and the machine stand 106 supporting the checkweigher. The checkweigher 101 comprises a pair of first supports 111, 112 arranged to support a pair of products to be weighed, in this case two tubes $T_1$, $T_2$. Each first support 111, 112 comprises a pair of first support units 111', 111''; 112', 112'', as will be described in detail in connection with FIG. 5. Two second supports 113, 114 are each mounted on a separate weighing cell 115, 116. Each second support 113, 114 comprises a pair of second support units 113', 113''; 114', 114'', as will be described in detail in connection with FIG. 6. A drive means 107 (indicated in FIG. 1) is connected to a support plate 108 onto which the first supports 111, 112 are attached. The drive means 107 is connected to the support plate 108 via a displaceable frame 109 (indicated in FIG. 7) to displace the first supports 111, 112 in the vertical direction relative to the second supports 113, 114. The displaceable frame 109 and the support plate 108 are mounted on the machine stand 104 for the first pick-and-place device 102. The frame 109 is slidably mounted in vertical guides on the machine stand 104 and is provided with a pair of horizontally extending arms (see FIG. 7). In order to minimize interference caused by vibration caused by the production line from disturbing the weighing of the products, the driving mechanism 107 for the support plate 108 and the first supports 111, 112 are mounted out of contact with the checkweigher 101 and its machine stand 106.

Figure 3:
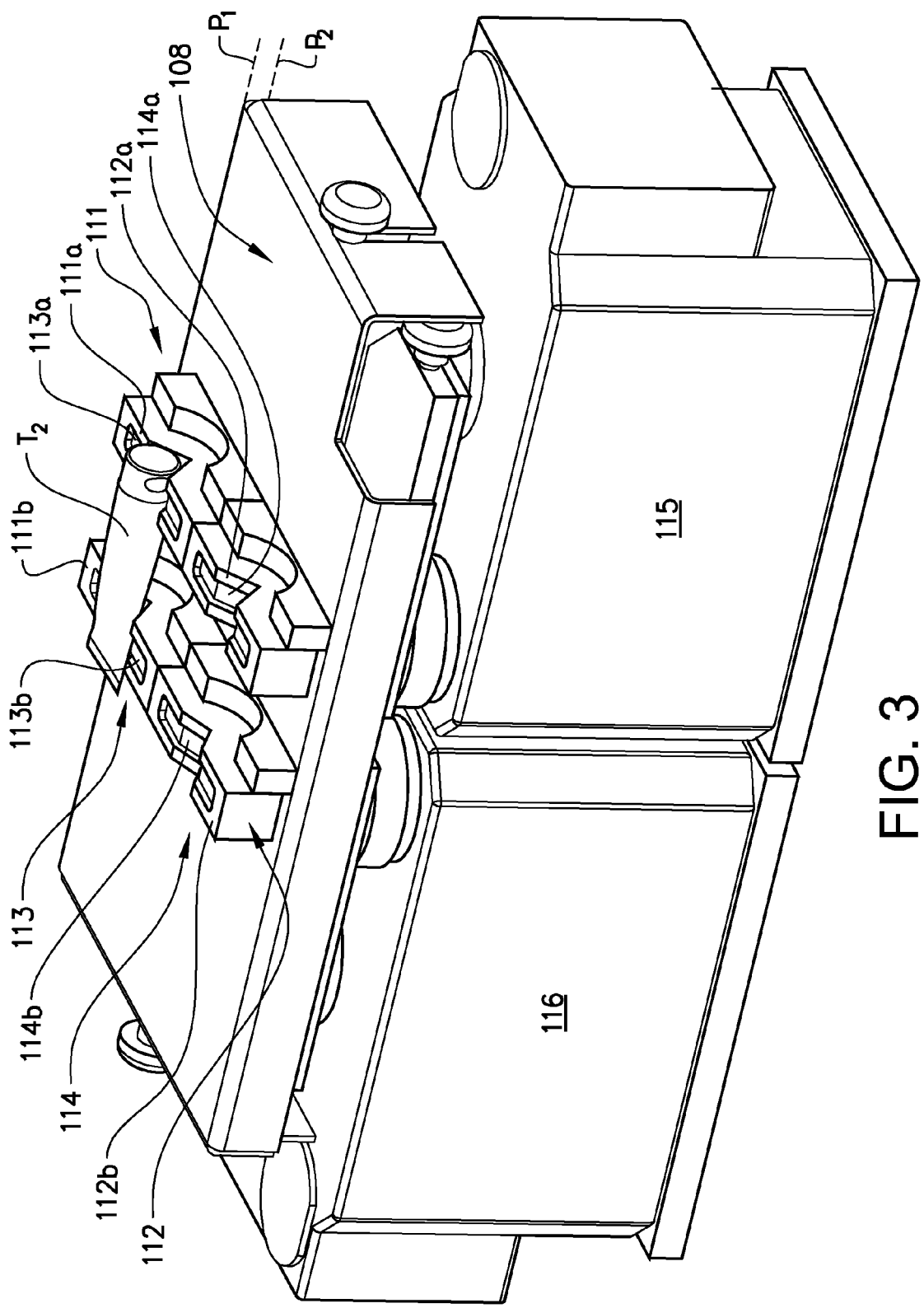
FIG. 3 shows a detailed view of the checkweigher of FIG. 2, with a support plate located in a first position.
Figure 4:
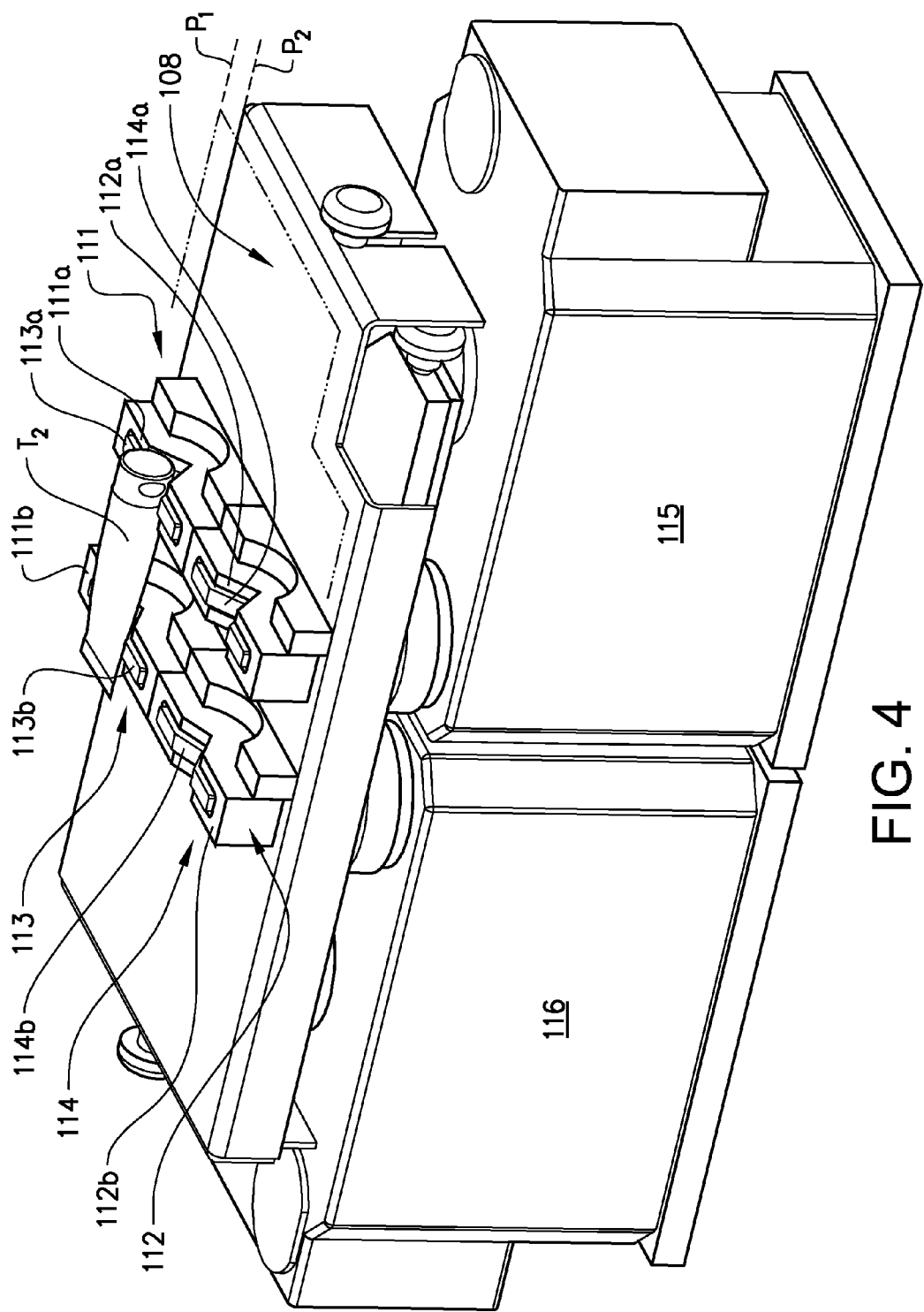
FIG. 4 shows a detailed view of the checkweigher of FIG. 2, with a support plate located in a second position.

The drive means 107 is arranged to displace the support plate 108 and the first supports 111, 112 from a first position $P_1$, where the first supports 111, 112 are located above the second supports 113, 114 (as indicated in FIG. 3), into a second position $P_2$, where the first supports 111, 112 are located beneath the second supports 113, 114 (as indicated in FIG. 4). In this second position, the two tubes $T_1$, $T_2$ are supported by the second supports 113, 114, whereby the two tubes $T_1$, $T_2$ weighed by their respective weighing cell 115, 116. After completion of the weighing of the tubes $T_1$, $T_2$, the tubes, the support plate 108 and the first supports 111, 112 are returned to the original, first position $P_1$. Consequently, the drive means 107 is arranged to displace the first supports 111, 112 from the second position $P_2$ into the first position $P_1$, so that the tubes $T_1$, $T_2$ are again supported by the first supports 111, 112. The total vertical displacement of the support plate 108 between the first and second positions $P_1$, $P_2$ in the example shown is approximately 6 mm. The tubes $T_1$, $T_2$ can then be removed by second pick-and-place device 103 and be replaced by a pair of subsequent tubes to be weighed.

FIG. 3 shown a detailed view of the checkweigher 101 of FIG. 2, with the support plate 108 located in the first position $P_1$. In the embodiment of FIG. 3 it can be seen that each of the first supports 111, 112 are arranged to support the tubes $T_1$, $T_2$ at two spaced locations, in order to provide a stable support and avoid movement of the tubes during displacement and weighing. For this purpose, each of the first supports 111, 112 comprises two spaced V-shaped support surfaces 111a, 111b; 112a, 112b, where a first pair of V-shaped support surfaces 111a, 111b supports each end of the first tube $T_1$ and a second pair of V-shaped support surfaces 112a, 112b supports each end of the second tube $T_2$. As can be seen from the figure, a vertical plane through one of the respective first supports 111, 112, in parallel with the two spaced V-shaped support surfaces 111a, 111b or 112a, 112b, is located at right angles to the main axes of the tubes $T_1$ and $T_2$. Each of the V-shaped support surfaces 111a, 111b; 112a, 112b on the first supports 111, 112 are mounted on a fixture releasably attached to the support plate 108.

Similarly, each of the second supports 113, 114 are arranged to support the tubes $T_1$, $T_2$ at two spaced locations adjacent the first supports 111, 112. Each of the second supports 113, 114 comprises two spaced V-shaped support surfaces 113a, 113b; 114a, 114b, where a first pair of V-shaped support surfaces 113a, 113b supports each end of the first tube $T_1$ and a second pair of V-shaped support surfaces 114a, 114b supports each end of the second tube $T_2$. A vertical plane through one of the respective second supports 113, 114, in parallel with the two spaced V-shaped support surfaces 113a, 113b or 114a, 114b, is located at right angles to the main axes of the tubes $T_1$ and $T_2$. Each of the V-shaped support surfaces 113a, 113b; 114a, 114b on the second supports 113, 114 are mounted on a fixture releasably attached to the weighing cells 115, 116. This will be described in further detail in connection with FIG. 5 below.

The first supports 111, 112 are mounted out of contact with the second supports 113, 114 in both the first and second positions $P_1$, $P_2$ as well as during the displacement of the first supports 111, 112. This is achieved by arranging a portion of each support surface 113a, 113b; 114a, 114b of the second supports 113, 114 to extend through openings in the support surfaces 111a, 111b; 112a, 112b of the first supports 111, 112. The openings in the respective support surfaces 111a, 111b; 112a, 112b have the same general shape as a cross-section in the horizontal plane through the corresponding support surface 113a, 113b; 114a, 114b of the second supports 113, 114. The size of the openings is sufficient to allow the second supports 113, 114 to pass through the said openings without contacting the first supports 111, 112 as the support plate 108 is displaced between its upper and lower positions $P_1$, $P_2$.

In this way products placed on the support surfaces 111a, 111b; 112a, 112b of the first supports 111, 112, as shown in FIG. 3, can be transferred to the support surfaces 113a, 113b; 114a, 114b of the second supports 113, 114 by lowering the first supports 111, 112 and the support plate 108 in the direction of the arrow A into the lower position $P_2$, as shown in FIG. 4. As can be seen in FIG. 4, the support surfaces 113a, 113b; 114a, 114b of the second supports 113, 114 extend above the support surfaces 111a, 111b; 112a, 112b of the first supports 111, 112. In the position shown in FIG. 4 each weighing cell 115, 116 is only required to support one tube and its second support. In this way the total weight measured by the weighing cells 105, 106 can be minimized and the accuracy of the measurement is improved. In FIGS. 3 and 4 only one tube is shown in order to allow the support surfaces to be seen more clearly.

The upper contact surfaces will maintain each product in this position during the placing, the displacement and the weighing procedure as well as during the subsequent removal of the products. For this reason the upper contact surfaces of the first and second supports will as a rule have the same or at least similar shapes. However, the shape of the respective upper surfaces is determined by the shape of the product and/or the relative positioning of the first and second supports. In order to allow the checkweigher to handle products being within the weight range of the weighing cells, but having a different size or shape, the first and second supports may be replaceable. In this way it is possible to exchange a set of first and second supports having a first shape with a set of first and second supports having a second shape.

Figure 5:
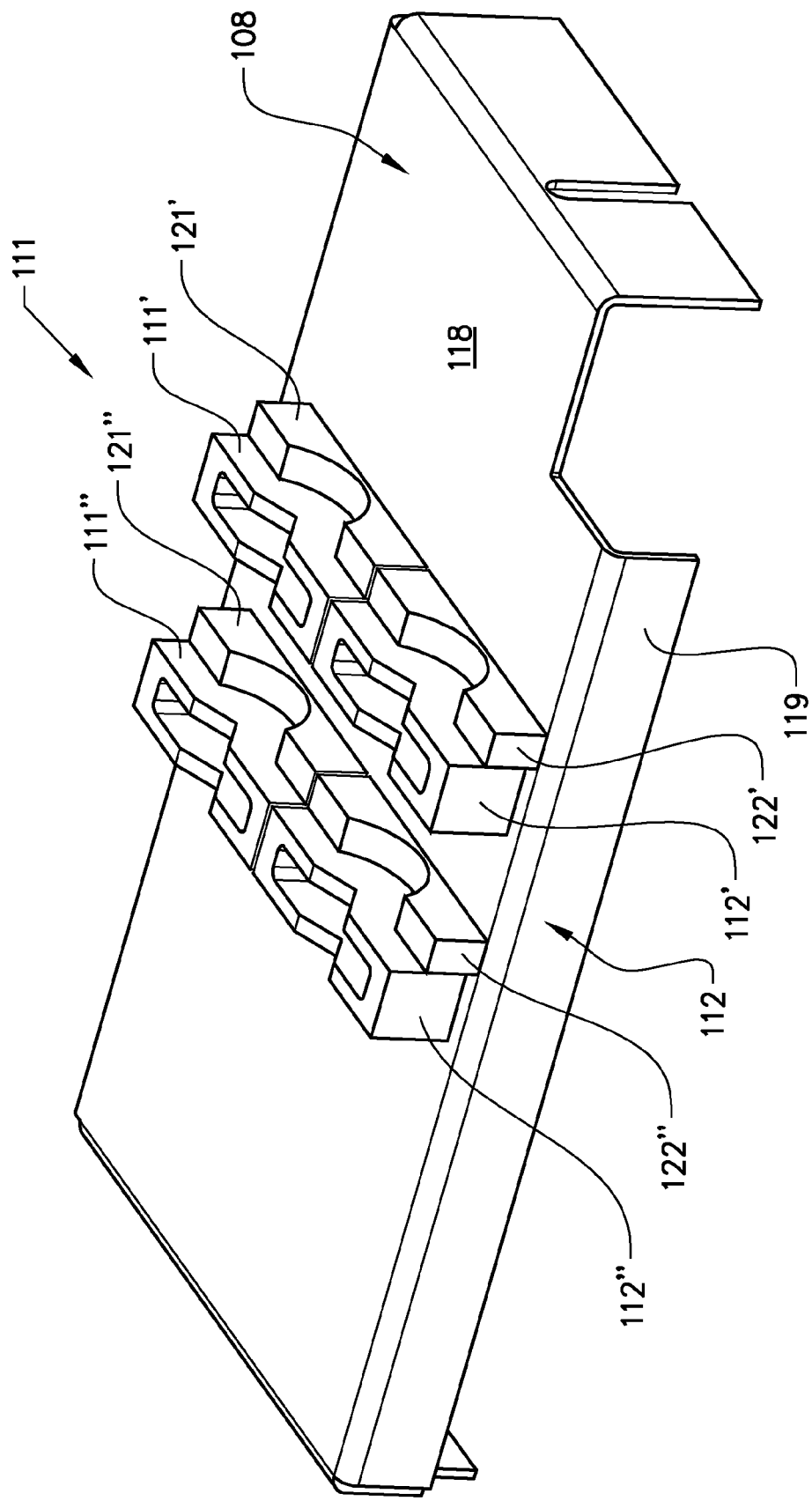
FIG. 5 shows two first supports mounted on the support plate of FIG. 4.

FIG. 5 shows the support plate 108 of FIG. 4 with replaceable first supports 111, 112. Each first support 111, 112 comprises a pair of first support units 111', 111''; 112', 112''. The replaceable first supports 111, 112 are attached to an upper surface 118 of the support plate 108 which extends over the upper surface both weighing cells 105, 106 in the horizontal plane (see FIG. 4). Also, the support plate 108 extends a predetermined distance in the vertical plane below its horizontal upper surface to form a skirt 119 around at least part of the periphery of the support plate 108. In addition to provide a means for attaching replaceable first supports 111, 112, the support plate 108 also serves to protect load sensing components on the upper portion of the weighing cells 115, 116. The horizontal, upper surface 118 prevents products, leaking substances or any parts of the transfer mechanism from direct or accidental contact with the weighing cells. In addition, the horizontal, upper surface 118 and the vertical, circumferential skirt 119 minimizes the effect of turbulence created by rapidly moving pick-and-place devices 102, 103 (see FIG. 1) from interfering with the weighing process.

Each of the first support units 111', 111"; 112', 112" of the first supports 111, 112 is attached to the support plate 108 by means of a corresponding first fixture 121', 121"; 122', 122". In this way, each individual first support unit attached to the support plate is arranged to be replaceable by the detachment of an associated individual first fixture.

Alternatively, adjacent first support units 111', 111" and 112', 112" attached to the support plate could be arranged to be replaced by the detachment of an associated, common first fixture. In this example, adjacent first support units 111', 111" and 112', 112" could be replaced at the same time by removing a single, common fixture comprising joined first fixtures 121', 121" and 122', 122", respectively.

According to a further alternative, the first 121', 121"; 122', 122" attached to suitable fixtures on the support plate 108 could be arranged to be replaced by removing and replacing at least one section of the upper surface 118 of the support plate 108, or the entire support plate 108. A section of the upper surface 118 can comprise a cut-out, such as a square or rectangular portion, in the upper surface onto which section one or more fixtures are attached. The at least one removable section is attached to the support plate 108 by suitable connector means.

Figure 6:
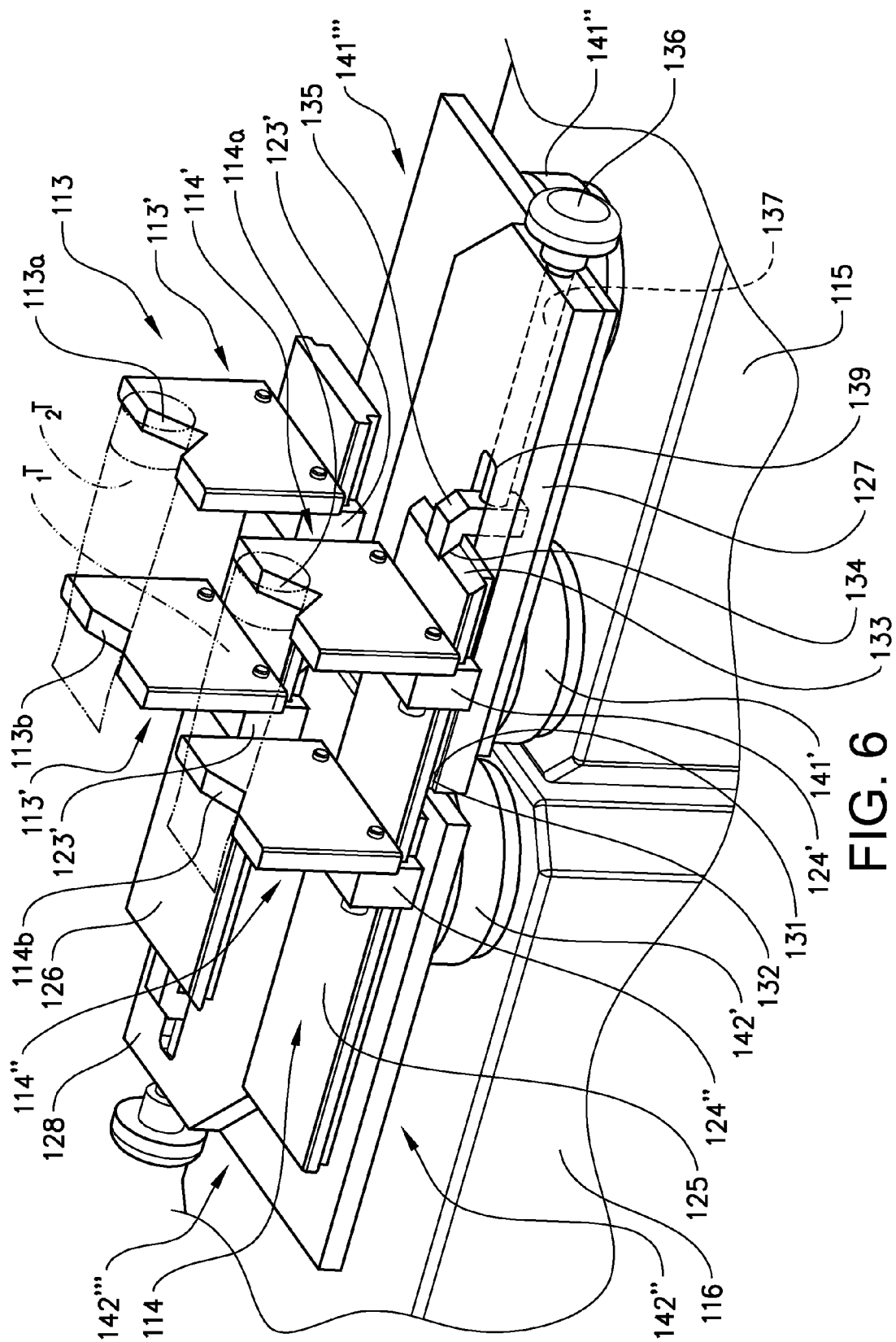
FIG. 6 shows two second supports, each is mounted on a separate weighing cell.

FIG. 6 shows two second supports 113, 114 where each is mounted on a separate weighing cell 115, 116. Each second support 113, 114 comprise a pair of second support units 113', 113" and 114', 114". The second support units 113', 113" and 114', 114" is arranged to be replaced by the detachment of an associated second fixture. The second fixture comprises a number of clamping units 123', 123"; 124', 124" and a pair of attachment plates 125, 126. Each of the second support units 113', 113" and 114', 114" is fixed to a corresponding clamping unit 123', 123"; 124', 124" by means of screws, bolts, or similar suitable means. This arrangement allows individual second support units 113', 113', 114', 114" to be replaced, after removal of the support plate 108. Each pair of second support units 113', 113" and 114', 114" is fixed in predetermined positions along a fixture plate 125 and 126 by means of a corresponding pair of clamping units 123', 123" and 124', 124". The fixture plate 125 and 126 extend with their main axis at right angles to a vertical plane through the main surfaces of the second support units 113', 113" and 114', 114".

Each fixture plate 125, 126 with its respective second support 113, 114 is releasably mounted on an associated attachment plate 127, 128 by a suitable mechanical, spring loaded quick release mechanism. The fixture plates 125, 126 are attached to its respective attachment plate 127, 128 by a dovetail connection. As indicated for the fixture plate 125 in FIG. 6, the dovetail connection comprises a first angled surface 131 extending from the lower surface of the fixture plate 125 at right angles to main axis of the fixture plate. A cooperating angled surface 132 extends from the upper surface of the attachment plate 127. One end of the fixture plate 125 comprises a second angled surface 133. A cooperating angled surface 134 is located on a quick release clamping unit 135 mounted to the attachment plate 127. The clamping unit 135 is held in contact with the fixture plate 125 by a compression spring (not shown) acting between the clamping unit 135 and the fixture plate 125. The clamping unit 135 is released by applying a force to an actuating means 136, connected to the clamping unit 135 by a rod 137. Actuation of the actuating means 136 allows the clamping unit 135 to be displaced in a slot 139 in the attachment plate 127 against the force of the compression spring. When the clamping unit 135 has been released, the fixture plate 125 with the first supports 113, 114 can be removed from the attachment plate 127. The respective attachment plates 127 and 128 are fixed to the upper surface of a number of load supports 141', 141", 141''' and 142', 142", 142''' connecting each second support to their respective load cell. Each weighing cell 115, 116 in this example have three load supports, although not all are shown in the figures.

The weighing cells used in this example are available from Wipotec® (series EC 2000-2-AVC-FS). The weighing range of the weighing cells is up to 750 g and they are supplied with the required electronics and software for the above purpose. For example, the checkweigher used are provided with weighing cells which are electronically controlled and monitored and is connected to a control unit or computer provided with suitable software for continuous monitoring of the products placed on the weighing cell. The control unit is provided with predetermined data relating to the weight of the container used for the current substance to be filled and the weight of the associated fixture components supporting the product. The control unit can then compensate for the known data in order to determine the weight of the substance that has been filled into the container.

Figure 7:
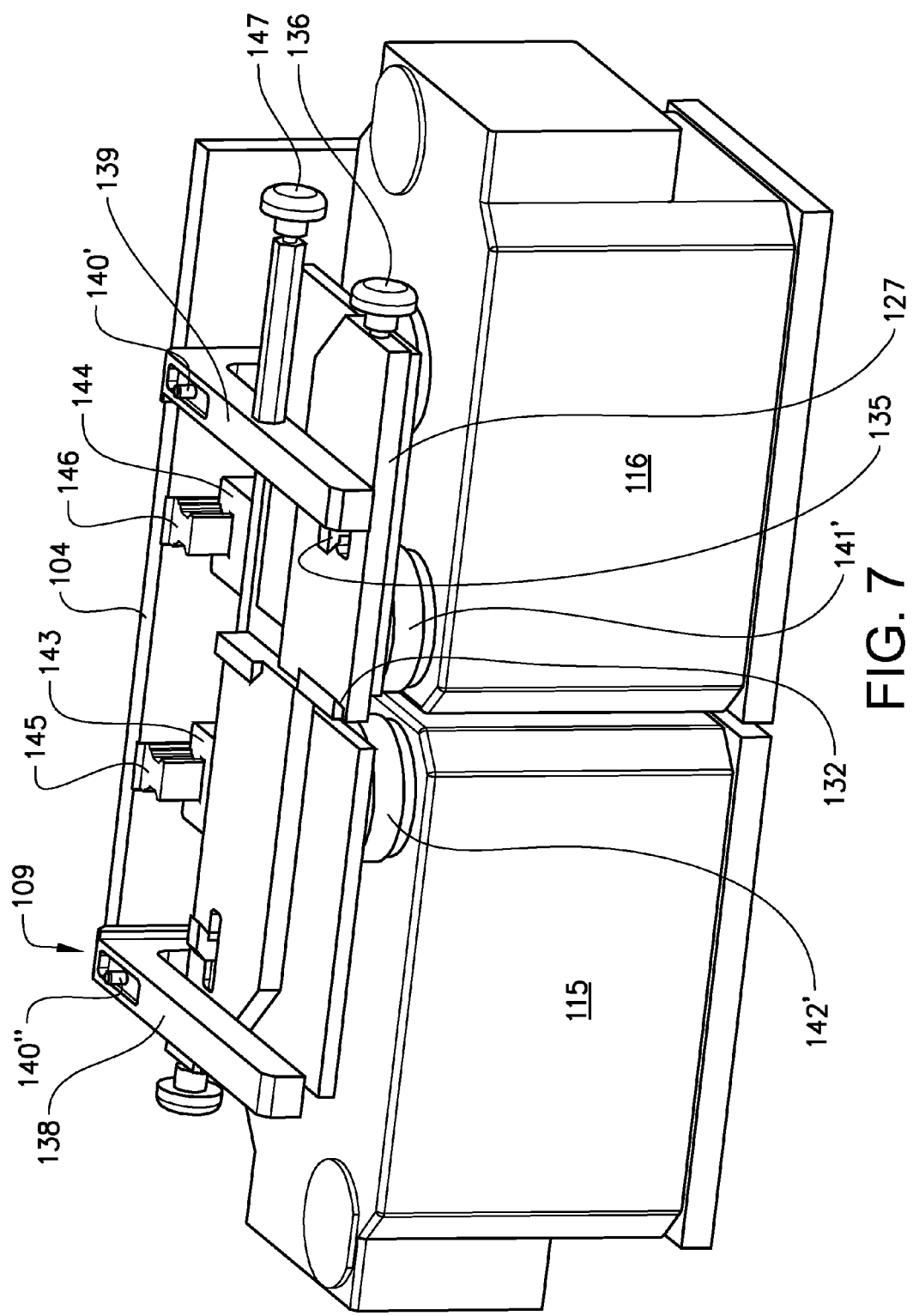
FIG. 7 shows a section of the frame and supporting arms for the support plate.

FIG. 7 shows a section of the frame 109 and a pair of supporting arms 138, 139 for the support plate 108 shown in FIG. 1. The frame 109 is provided with a pair of tracks 143, 144 slidably mounted in vertical guides 145, 146 on the machine stand 104 (see FIG. 1). The supporting arms 138, 139 extend in a horizontal direction from the frame and substantially across the weighing cells 115, 116. Each supporting arm 138, 139 is provided with a locating pin 140', 140" to ensure correct positioning of the support plate during mounting. One of the supporting arms 139 is provided with an actuating means 147 that is actuated in order to release the supporting plate. When the supporting plate is in position the actuating means 147 is released to lock the supporting plate in place.

The invention is not limited to the embodiments described above. For instance, in the embodiment shown in the figures, each fixture plate is attached to one weighing cell and is arranged to be suspended with one free end extending over the adjacent other weighing cell. This arrangement allows the weighing cells used in this example to be mounted side-by-side to create a compact unit requiring a minimum of space, which facilitates the incorporation of the assembled checkweigher into the production line. Other arrangements of such weighing cells is of course possible within the scope of the invention. Also, the above examples relates to consumer products packaged in tubes or similar. However, such a weighing cell can be adapted for performing check weighing of suitably packaged consumer products, cosmetic products or medicinal products of the types indicated above.

The invention claimed is:

1. A method for weighing individual products being moved along a production line, which products are moved along the production line by at least one manipulator, the method comprising:

transferring at least one product from the production line to a checkweigher comprising at least one weighing cell;

placing at least one product in a first position on a first support positioned above and mechanically isolated from a corresponding weighing cell, wherein the first support dampens movement of said at least one product;

displacing said first support to place said at least one product in a second position on a second support operably coupled to the weighing cell;

weighing the at least one product;

displacing the at least one product back to the first position by means of said first support; and transferring the at least one product from the checkweigher back to the production line.

2. The method according to claim 1, further including:
displacing the at least one product onto the second support by lowering said first support out of contact with the said at least one product.

3. The method according to claim 1, further including:
displacing the at least one product out of contact with the second support by raising said first support.

4. The method according to claim 1, further including:
placing each product on a separate first support above each corresponding weighing cell.

5. The method according to claim 4, further including:
displacing the products by means of said first supports and placing each product onto a separate second support on the corresponding weighing cell.

6. The method according to claim 1, further including:
weighing the at least one product using a weighing cell supporting each product and its second support.

7. The method according to claim 1, further including:
displacing the first support using a driving mechanism mounted separate from the checkweigher.

8. The method according to claim 1, further including:
displacing the first support relative to the second support while maintaining the first and second supports out of contact.

9. An apparatus comprising:
a checkweigher for weighing individual products being moved along a production line, wherein the checkweigher comprises at least one first support arranged to support a product to be weighed and dampen movement of said product;

at least one second support mounted on a weighing cell, wherein said at least one first support is mechanically isolated from said weighing cell; and a driving mechanism connected to the at least one first support and arranged to displace the at least one first support relative to the second support, where the driving mechanism is arranged to displace each first support from the first position, located above the second support, into the second position, located beneath the second support, so that the at least one product is supported by the second support, and wherein the at least one product is weighed by the weighing cell.

10. The apparatus according to claim 9, wherein the driving mechanism is arranged to displace each first support from the second position into the first position, so that the at least one product is supported by the first support, and wherein the at least one product can be replaced by a subsequent product.

11. The apparatus according to claim 9, wherein the first support is mounted out of contact with the second support.

12. The apparatus according to claim 9, wherein each first support is arranged side-by-side with a corresponding second support.

13. The apparatus according to claim 9, wherein at least a portion of each second support is arranged to extend through the first support.

14. The apparatus according to claim 9, wherein the driving mechanism is mounted separate from the checkweigher.

15. The apparatus according to claim 9, wherein each of the first and second supports are provided with upper contact surfaces corresponding to a contacting surface on the products to be weighed.

16. The apparatus according to claim 10, wherein the first and second supports are replaceable.

17. The apparatus according to claim 9, wherein the first support is attached to a support plate extending over the upper surface of the at least one weighing cell and a predetermined distance below said upper surface around at least part of the periphery of the support plate.

18. An apparatus comprising:
a support arrangement for a checkweigher, the checkweigher for weighing individual products being moved along a production line, wherein the checkweigher comprises, at least one first support arranged to support a product to be weighed and dampen movement of said product;

at least one second support mounted on a weighing cell, wherein said at least one first support is mechanically isolated from said weighing cell; and a driving mechanism connected to the at least one first support and arranged to displace the at least one first support relative to the second support, wherein the driving mechanism is arranged to displace each first support from the first position, located above the second support, into the second position, located beneath the second support so that the at least one product is supported by the second support and wherein the at least one product is weighed by the weighing cell;

wherein the support arrangement includes the at least one first support attached to a support plate by means of at least one first fixture, and the at least one second support attached to a weighing cell by means of a second fixture.

19. The support arrangement according to claim 18, wherein each first support attached to the support plate is arranged to be replaced by the detachment of an associated first fixture.

20. The support arrangement according to claim 18, wherein adjacent first supports attached to the support plate are arranged to be replaced by the detachment of an associated, common first fixture.

21. The support arrangement according to claim 18, wherein the first supports attached to fixtures on the support plate are arranged to be replaced by removing at least a section of the support plate or the entire support plate.

22. The support arrangement according to claim 18, wherein the second supports attached to the weighing cell are arranged to be replaced by the detachment of an associated second fixture.

* * * * *

UNITED STATES PATENT AND TRADEMARK OFFICE
CERTIFICATE OF CORRECTION

PATENT NO. : 8,716,608 B2  Page 1 of 1
APPLICATION NO. : 13/202923
DATED : May 6, 2014
INVENTOR(S) : Karlsson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 248 days.

Signed and Sealed this
Twenty-ninth Day of September, 2015

Michelle K. Lee
*Director of the United States Patent and Trademark Office*